(12) United States Patent
Asada et al.

(10) Patent No.: US 8,570,004 B2
(45) Date of Patent: Oct. 29, 2013

(54) VEHICLE GENERATOR

(75) Inventors: Tadatoshi Asada, Anjo (JP); Harumi Horihata, Nagoya (JP)

(73) Assignee: Denso Corporation, Kariya (JP)

(*) Notice: Subject to any disclaimer, the term of this patent is extended or adjusted under 35 U.S.C. 154(b) by 398 days.

(21) Appl. No.: 13/009,121

(22) Filed: Jan. 19, 2011

(65) Prior Publication Data

US 2011/0175580 A1 Jul. 21, 2011

(30) Foreign Application Priority Data

Jan. 20, 2010 (JP) ................................. 2010-009742

(51) Int. Cl.
*H02P 9/00* (2006.01)
(52) U.S. Cl.
USPC .............................................. 322/45; 322/28
(58) Field of Classification Search
USPC ................... 322/22, 23, 37, 45, 59
See application file for complete search history.

(56) References Cited

U.S. PATENT DOCUMENTS

| | | | | |
|---|---|---|---|---|
| 4,788,486 A * | 11/1988 | Mashino et al. | ............... | 320/123 |
| 5,245,267 A * | 9/1993 | Pierret et al. | ................... | 320/119 |
| 5,444,355 A * | 8/1995 | Kaneyuki et al. | ............... | 322/58 |
| 6,504,346 B2 * | 1/2003 | Nakamura et al. | ............... | 322/90 |
| 7,535,203 B2 * | 5/2009 | Aoyama | .......................... | 322/24 |
| 2001/0054882 A1 * | 12/2001 | Nakamura et al. | ............... | 322/28 |
| 2006/0006655 A1 | 1/2006 | Kanazawa et al. | | |
| 2007/0182382 A1 * | 8/2007 | Aoyama | .......................... | 322/28 |
| 2007/0200346 A1 | 8/2007 | Kanazawa et al. | | |
| 2007/0295998 A1 | 12/2007 | Sumita | | |
| 2008/0036423 A1 * | 2/2008 | Asada | ........................... | 320/134 |
| 2011/0204856 A1 * | 8/2011 | Horihata | ......................... | 322/27 |
| 2012/0001598 A1 * | 1/2012 | Horihata et al. | ................. | 322/21 |
| 2012/0007568 A1 * | 1/2012 | Horihata et al. | ................. | 322/21 |
| 2012/0068671 A1 * | 3/2012 | Horihata et al. | ................. | 322/94 |
| 2012/0074914 A1 * | 3/2012 | Nakayama et al. | ............. | 322/94 |
| 2012/0081083 A1 * | 4/2012 | Horihata et al. | ................. | 322/99 |
| 2012/0086371 A1 * | 4/2012 | Nakayama et al. | ...... | 318/400.06 |
| 2012/0091973 A1 * | 4/2012 | Horihata | ......................... | 322/29 |
| 2012/0098503 A1 * | 4/2012 | Horihata et al. | ................. | 322/23 |

FOREIGN PATENT DOCUMENTS

| | | |
|---|---|---|
| GB | 2 301 949 | 12/1996 |
| JP | 8-336259 | 12/1996 |
| JP | 2006-033897 | 2/2006 |
| JP | 2008-004741 | 1/2008 |

OTHER PUBLICATIONS

Office Action (1 page) dated Jun. 11, 2013 issued in corresponding Japanese Application No. 2010-009742 and English translation (1 page).

* cited by examiner

*Primary Examiner* — Nicholas Ponomarenko
(74) *Attorney, Agent, or Firm* — Nixon & Vanderhye PC

(57) ABSTRACT

The vehicle generator includes a rotor wound with a field winding, a stator wound with a stator winding, rectifier modules respectively connected to corresponding output terminals of the stator winding, and a power generation control device to control a power generation voltage of the vehicle generator formed from outputs of the rectifier modules by controlling an excitation current flowing through the field winding. Each of the rectifier modules includes a pair of a first MOS transistor and a second MOS transistor series-connected between positive and negative terminals of a battery. The rectifier modules are connected with one another through a communication line. The rectifier modules exchange data regarding control of the first and second MOS transistors of the rectifier modules by a pulse train signal transmitted on the communication line.

8 Claims, 12 Drawing Sheets

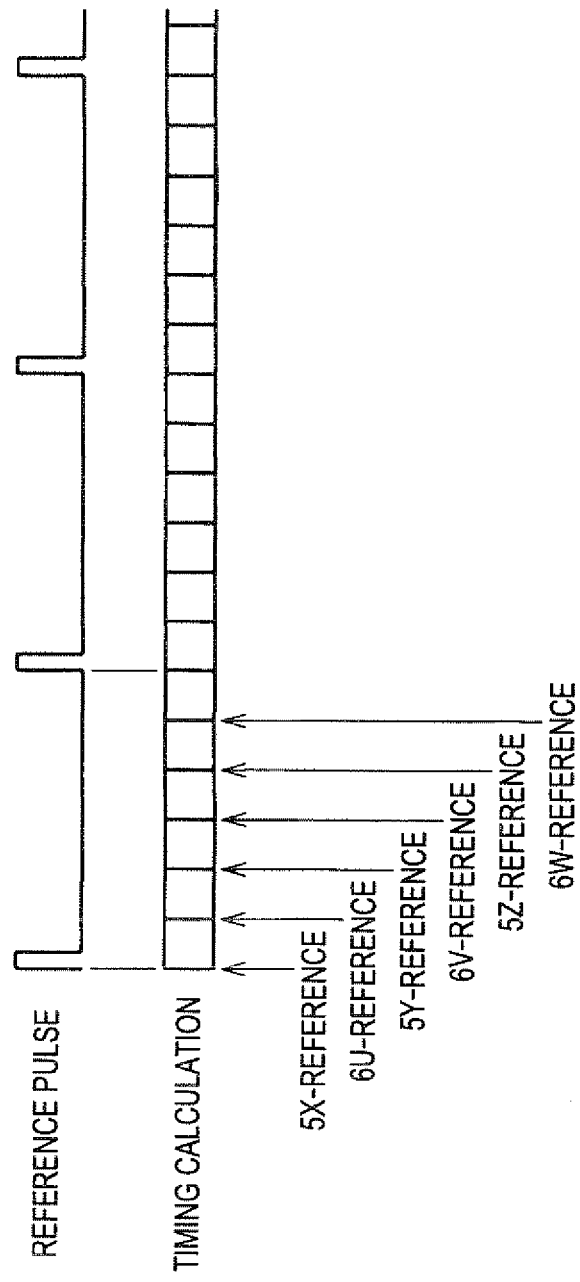

US 8,570,004 B2

VEHICLE GENERATOR

This application claims priority to Japanese Patent Application No. 2010-9742 filed on Jan. 20, 2010, the entire contents of which are hereby incorporated by reference.

BACKGROUND OF THE INVENTION

1. Field of the Invention

The present invention relates to a vehicle generator mounted on a vehicle such as a passenger car or a truck.

2. Description of Related Art

There is known a vehicle alternating-current generator provided with a three-phase full-wave rectifier constituted of power MOS transistors to improve power generation performance. For example, refer to Japanese Patent Application Laid-Open No. H8-336259. In the above vehicle generator, gate control voltages for on/off-controlling six power MOS transistors constituting the three-phase full-wave rectifier are generated by a controller.

However, the conventional vehicle generator as described in the above patent document has a problem in that since all the power MOS transistors constituting the three-phase full-wave rectifier are on/off-controlled by the same controller, if this controller malfunctions, the three-phase full-wave rectifier stops functioning. It might occur to adopt a configuration in which the power MOS transistors constituting the three-phase full-wave rectifier are grouped into each of the phases of the stator winding, and the controller is provided for each group so that even when one of the controllers provided for a corresponding one of the groups malfunctions, the vehicle generator can continue to perform a partial power generating operation using the other controllers. However, such a configuration is difficult to implement because since it is difficult for the controllers to cooperate with one another, it is difficult to control the phase current of the vehicle generator as a whole, and to locate a fault in the phases of the vehicle generator.

SUMMARY OF THE INVENTION

The present invention provides a vehicle generator comprising:

a rotor wound with a field winding for energizing magnetic poles of the rotor;

a stator wound with a stator winding as a multi-phase winding for generating an AC voltage depending on a rotating magnetic file generated by the field winding;

rectifier modules respectively connected to corresponding output terminals of the stator winding; and a power generation control device to control a power generation voltage of the vehicle generator formed from outputs of the rectifier modules by controlling an excitation current flowing through the field winding;

wherein each of the rectifier modules includes a pair of a first MOS transistor and a second MOS transistor series-connected between positive and negative terminals of a battery, the rectifier modules are connected with one another through a communication line, and the rectifier modules exchange data regarding control of the first and second MOS transistors of the rectifier modules by a pulse train signal transmitted on the communication line.

According to the present invention, there is provided a vehicle generator capable of continuing to reliably perform a partial power generating operation when a fault occurs in the rectifier modules thereof.

Other advantages and features of the invention will become apparent from the following description including the drawings and claims.

BRIEF DESCRIPTION OF THE DRAWINGS

In the accompanying drawings:

FIG. 14 is a diagram showing a relationship between output timings of a reference pulse generated by the position sensor and control timings of the rectifier modules.

PREFERRED EMBODIMENTS OF THE INVENTION

Figure 1:
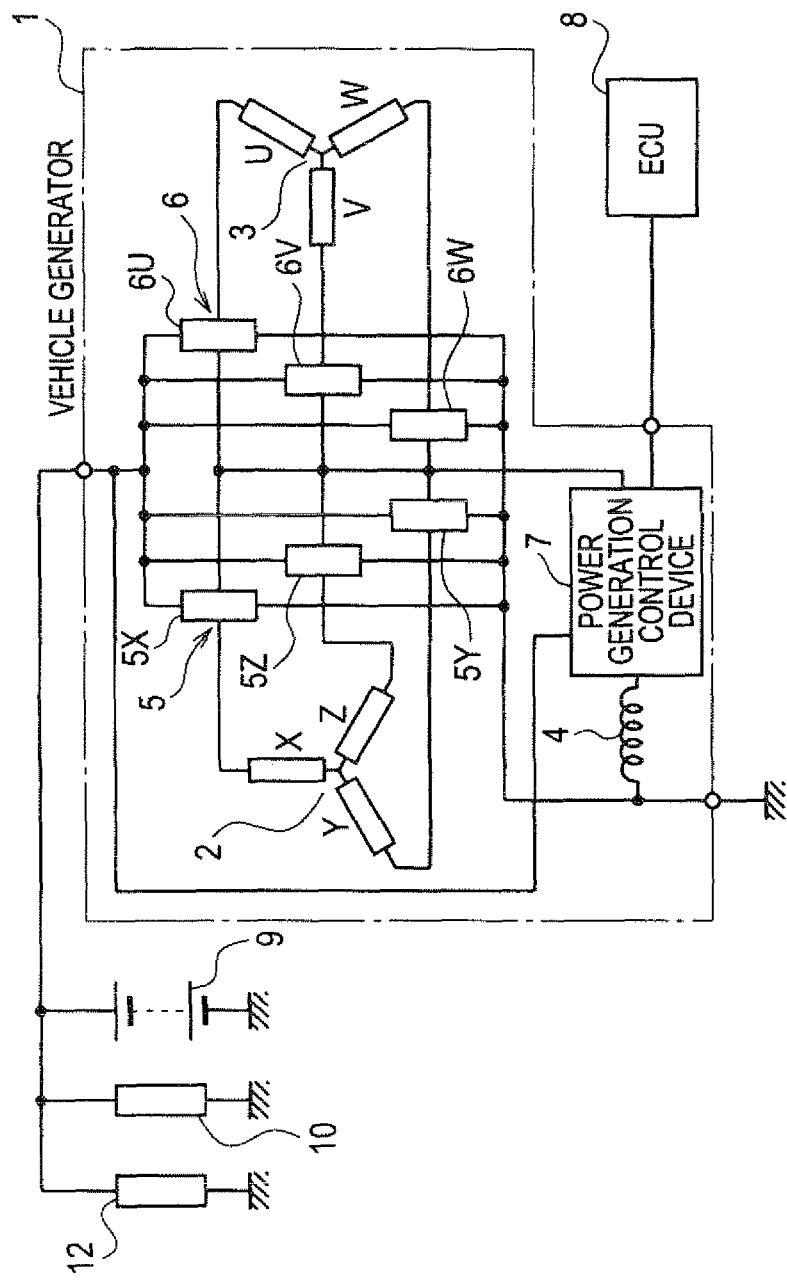
FIG. 1 is a diagram showing the structure of a vehicle generator according to an embodiment of the invention.

FIG. 1 is a diagram showing the structure of a vehicle generator 1 according to an embodiment of the invention. As shown in FIG. 1, the vehicle generator 1 includes two stator windings 2 and 3, a field winding 4, two rectifier module groups 5 and 6, and a power generation control device 7.

The stator winding 2 is a multi-phase winding (in this embodiment, a three-phase winding including an X-phase winding, a Y-phase winding and a Z-phase winding) wound around a stator core (not shown). The stator winding 3 is also a multi-phase winding (in this embodiment, a three-phase winding including a U-phase winding, a V-phase winding and a W-phase winding) wound around the same stator core with a displacement of 30 degrees in electrical angle with respect to the stator winding 2. The stator windings 2 and 3, and the stator core constitute a stator of the vehicle generator 1.

The field winding 4 is wound around field magnetic poles (not shown) disposed facing the inner circumference of the stator core to form a rotor of the vehicle generator 1. The magnetic poles are energized when an excitation current is passed to the field winding 4. Each of the stator windings 2 and 3 generates an AC voltage by the rotating field generated when the magnetic poles are energized.

The rectifier module group 5 forming a three-phase full-wave rectifier is connected to the stator winding 2. The rectifier module group 5 includes rectifier modules 5X, 5Y and 5Z for the respective three phases of the stator winding 2. The rectifier module 5X is connected to the X-phase winding of the stator winding 2. The rectifier module 5Y is connected to the Y-phase winding of the stator winding 2. The rectifier module 5Z is connected to the Z-phase winding of the stator winding 2.

The rectifier module group 6 forming a three-phase full-wave rectifier is connected to the stator winding 3. The rectifier module group 6 includes rectifier modules 6U, 6V and 6W for the respective three phases of the stator winding 3. The rectifier module 6U is connected to the U-phase winding of the stator winding 3. The rectifier module 6V is connected to the V-phase winding of the stator winding 3. The rectifier module 6W is connected to the W-phase winding of the stator winding 3.

The power generation control device 7 controls the excitation current flowing through the excitation winding 4 to thereby control the power generation voltage of the vehicle generator 1 (the output voltages of the respective rectifier modules). The power generation control device 7 is connected to an ECU 8 as an external control device, and exchanges various signals with the ECU 8.

Next, the structure of the rectifier modules is explained.

Figure 2:
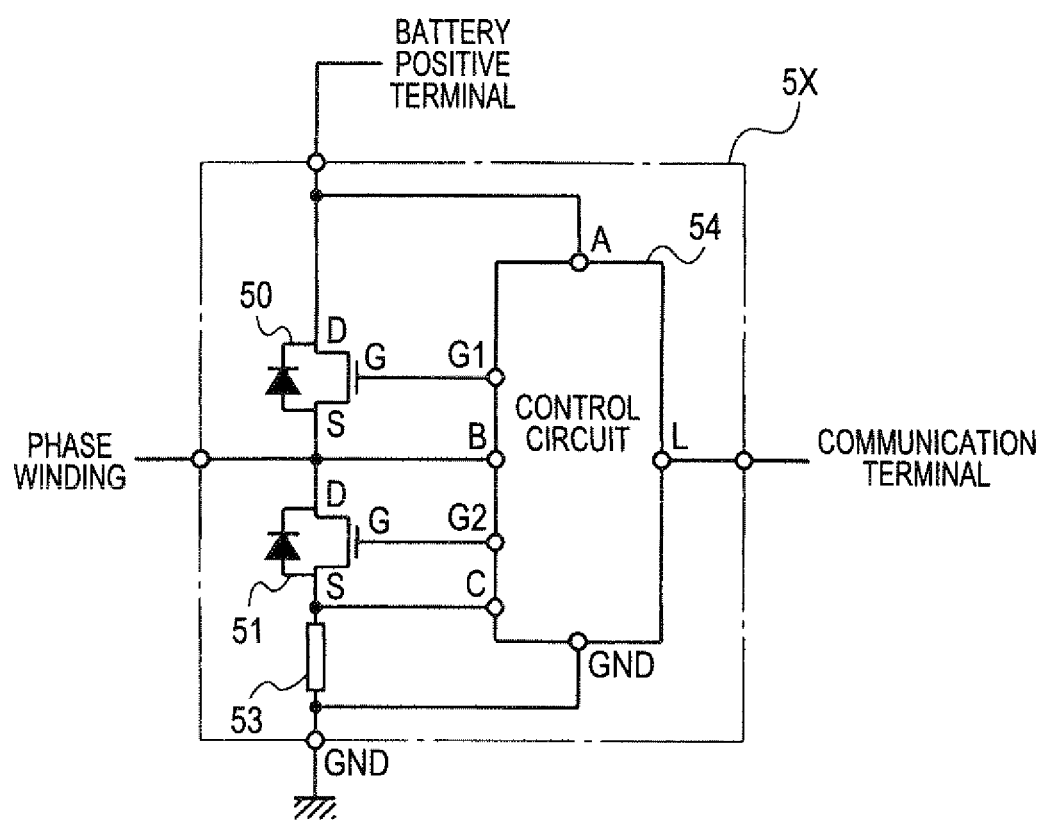
FIG. 2 is a diagram showing the structure of rectifier modules included in the vehicle generator shown in FIG. 1.

FIG. 2 is a diagram showing the structure of the rectifier module 5X. The other rectifier modules 5Y, 5Z, 6U, 6V and 6W have the same structure as that of the rectifier module 5X. As shown in FIG. 2, the rectifier module 5X includes two MOS transistors 50 and 51, a current detection element 53 and a control circuit 54. The MOS transistor 50, which is connected to the X-phase winding of the stator winding 2 at the source thereof, connected to the positive terminal 9 of a battery 9 at the drain thereof, operates as a high-side switching element. The MOS transistor 51, which is connected to the X-phase winding of the stator winding 2 at the drain thereof, and connected to the grounded negative terminal of the battery 9 at the source thereof operates as a low-side switching element.

Figure 3:
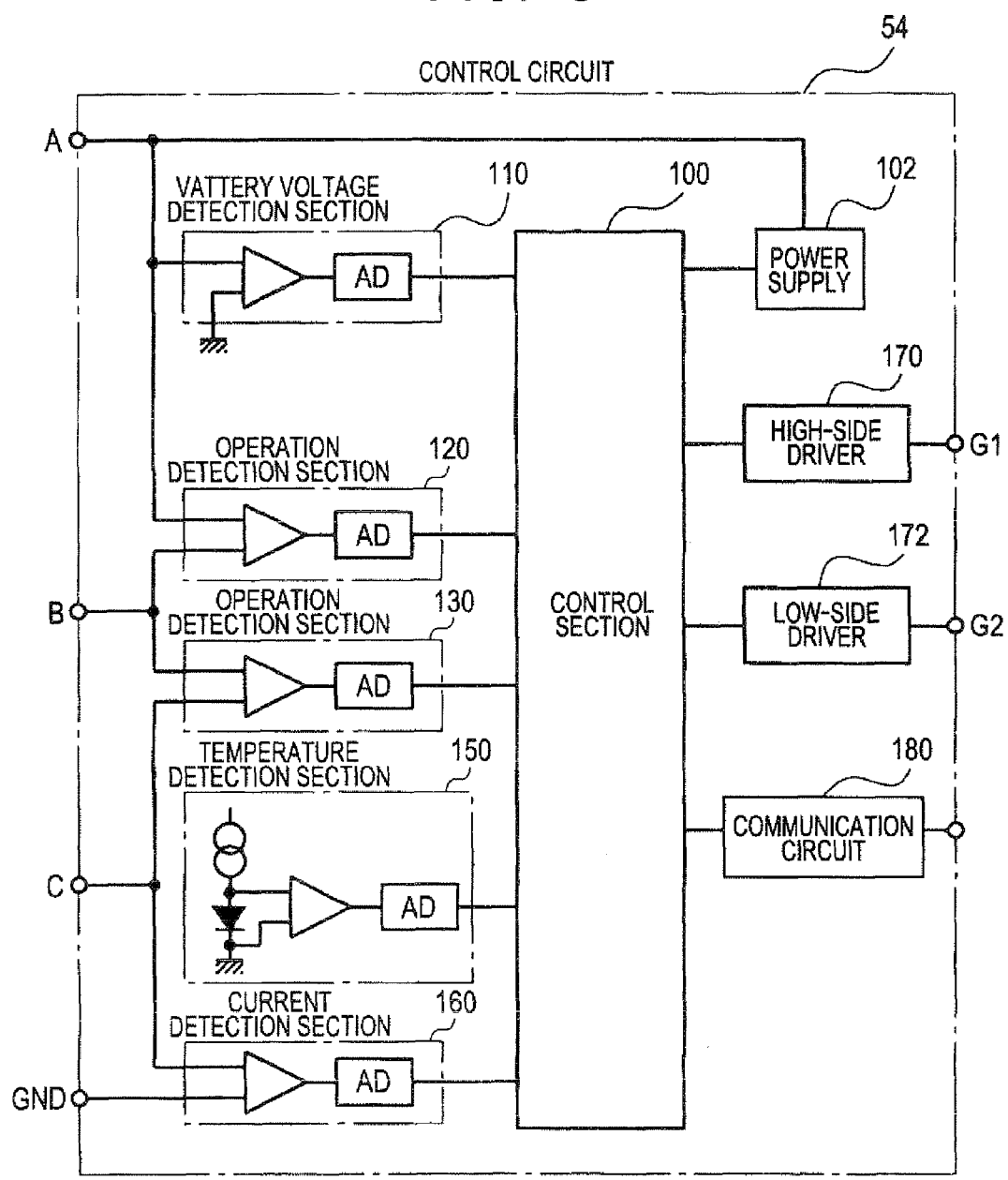
FIG. 3 is a diagram showing the structure of a control circuit included in each of the rectifier modules shown in FIG. 2.

FIG. 3 is a diagram showing the structure of the control circuit 54. As shown in FIG. 3, the control circuit 54 includes a control section 100, a power supply 102, a battery voltage detection section 110, operation detection sections 120 and 130, a temperature detection section 150, a current detection section 160, a high-side driver 170, a low-side driver 172, and a communication circuit 180.

The power source 102 starts to operate when a vehicle engine is started and the phase voltage is generated in the X-phase winding of the stator winding 2 to supply operating voltage to the components included in the control circuit 54.

The high-side driver 170 is connected to the gate of the high-side MOS transistor 50 at the output terminal (G1) thereof, and generates a drive signal to turn on and off the MOS transistor 50. Likewise, the low-side driver 172 is connected to the gate of the low-side MOS transistor 51 at the output terminal (G2) thereof, and generates a drive signal to turn on and off the MOS transistor 51.

The battery voltage detection section 110, which is constituted of a differential amplifier and an A/D converter, outputs data indicative of the voltage of the positive terminal of the battery 9.

The operation detection section 120, which is constituted of a differential amplifier and an A/D converter, outputs data indicative of the source-drain voltage of the high-side MOS transistor 50 (the voltage between the A-terminal and the B-terminal shown in FIGS. 2 and 3). The control section 100 monitors the operation of the MOS transistor 50 driven by the high-side driver 170 based on this data, and performs control and fault detection of the MOS transistor 50 as necessary.

The operation detection section 130, which is constituted of a differential amplifier and an A/D converter, outputs data indicative of the source-drain voltage of the low-side MOS transistor 51 (the voltage between the B-terminal and the C-terminal shown in FIGS. 2 and 3). The control section 100 monitors the operation of the MOS transistor 51 driven by the low-side driver 172 based on this data, and performs control and fault detection of the MOS transistor 51 as necessary.

The temperature detection section 150, which is constituted of a constant-current source, a diode, a differential amplifier and an A/D converter, outputs data indicative of the temperature-dependent forward voltage drop of this diode. The control section 100 monitors the temperature of the rectifier module 5X to detect a thermal fault of the rectifier module 5X.

The current detection section 160, which is constituted of a differential amplifier and an A/D converter, outputs data indicative of the voltage across the current detection element 53 such as a resistor (the voltage between the C-terminal and the GND-terminal). The control section 100 monitors the source-drain current of the low-side MOS transistor 51 based on this data to detect a short-circuit or breakage of the X-phase winding.

The communication circuit 180 is connected to the communication terminal (P-terminal) of the power generation control device 7, and exchanges a pulse train signal with the rectifier modules through the communication line (the rectifier communication bus) connected to the P-terminal. The six rectifier modules 5X, 5Y, 5Z, 6U, 6V and 6W are connected to one another through this communication line so that the pulse train signal as data for control of the MOS transistors 50 and 51 can be exchanged among these rectifier modules.

Next, examples (1) to (6) of data exchange through this communication line and the operations performed using this data are explained.

Example (1)

On/off timings of the MOS transistors 50 and 51 are set based on the pulse train signal on the communication line.

Figure 4:
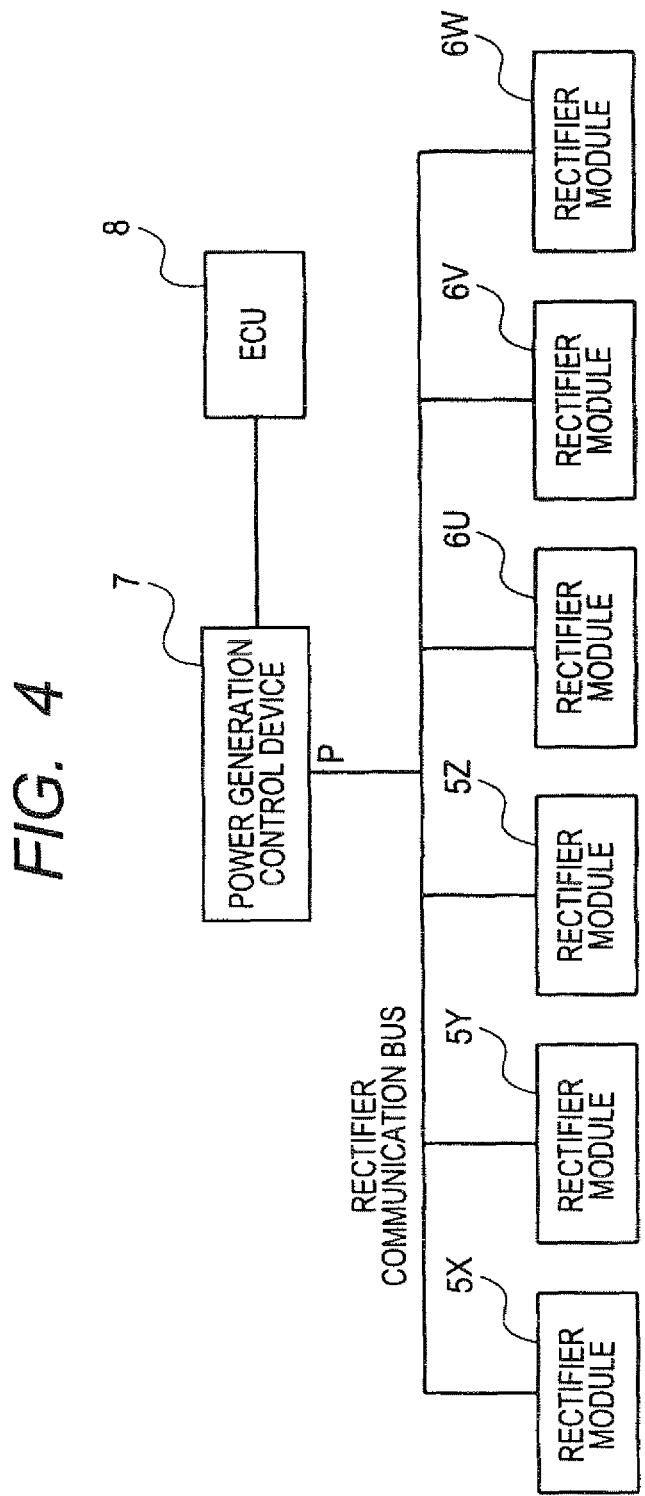
FIG. 4 is a diagram showing connection among a power generation control device, the rectifier modules and an ECU by use of a rectifier communication bus.

FIG. 4 is a diagram showing connection among the power generation control device 7, rectifier modules and ECU 8. In this example, the six rectifier modules 5X, 5Y, 5Z, 6U, 6V and 6W are connected to the rectifier communication bus as the communication line. This rectifier communication bus is also connected with the P-terminal of the power generation control device 7.

Figure 5:
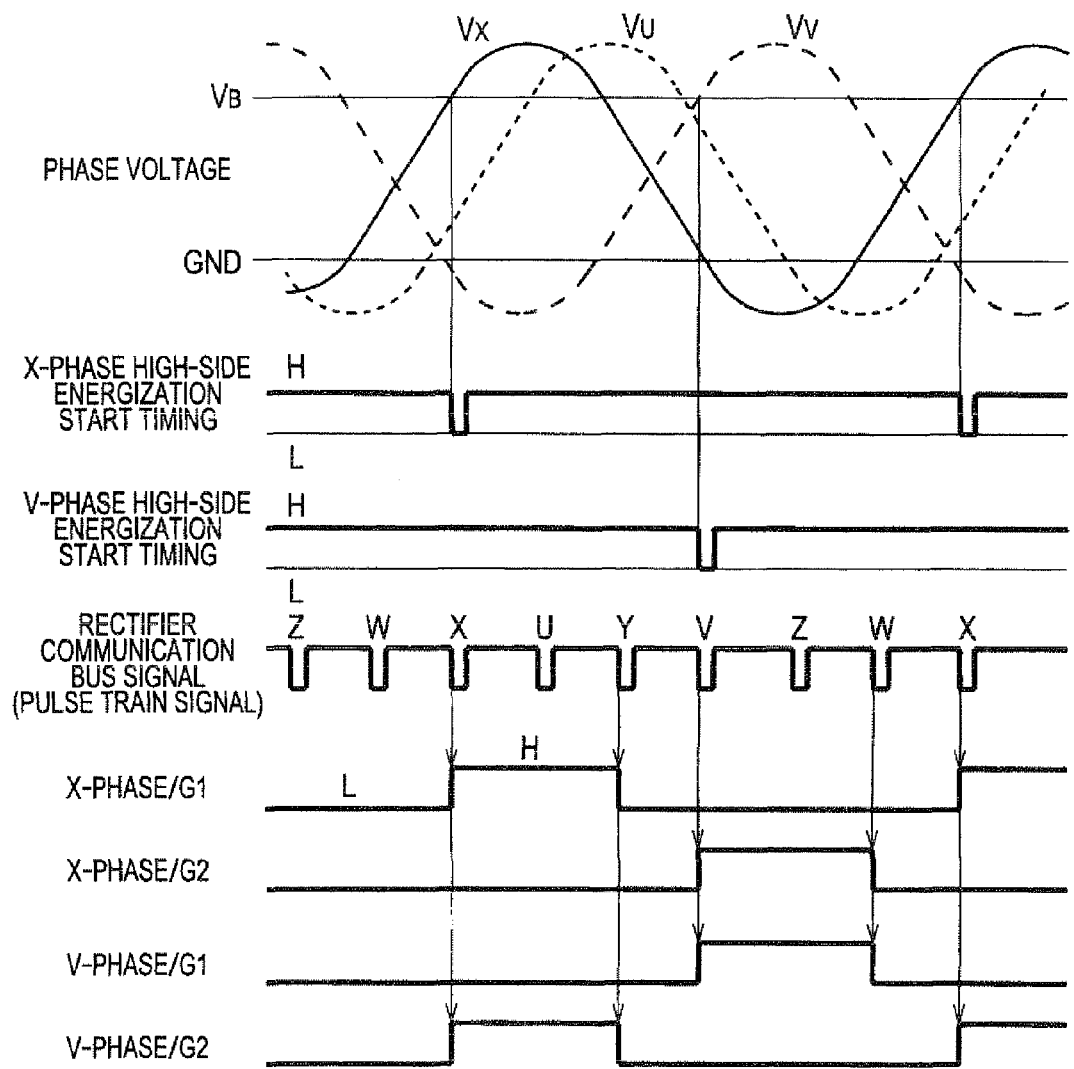
FIG. 5 is a diagram showing a time relationship between a pulse-train signal delivered to the rectifier communication bus and the operations of the rectifier modules.

FIG. 5 is a diagram showing a relationship between the pulse-train signal delivered to the rectifier communication bus and the operations of the rectifier modules. In FIG. 5, the notation "X-PHASE HIGH-SIDE ENERGIZATION START TIMING" indicates a timing at which the high-side MOS transistor 50 of the rectifier module 5X is turned on. A moment at which the voltage of the X-phase winding (X-phase voltage) exceeds a predetermined threshold voltage (the battery voltage $V_B$, for example) is set as this timing. At this X-phase high-side energization start timing, the control circuit 54 of the rectifier module 5X changes the voltage of the rectifier communication bus from the high level to the low level for a predetermined time interval. Likewise, the notation "V-PHASE HIGH-SIDE ENERGIZATION START TIMING" indicates a timing at which the high-side MOS transistor 50 of the rectifier module 6V is turned on. A moment at which the voltage of the V-phase winding (V-phase voltage) exceeds a predetermined threshold voltage is set as this timing. At this V-phase high-side energization start timing, the control circuit 54 of the rectifier module 6V changes the voltage of the rectifier communication bus from the high level to the low level for a predetermined time interval. The above explanation is applied also to the other rectifier modules. Accordingly, the pulse train signal changing to the low level at intervals of 60 degrees in electrical angle is delivered to the rectifier communication bus.

Each of the rectifier modules sets on-timing or off-timing of the MOS transistors 50 and 51 based on the pulse train signal delivered to the rectifier communication bus. In FIG. 5, the notation "X-PHASE.G1" indicates the gate signal G1 outputted from the control circuit 54 of the rectifier module 5X to the MOS transistor 50, and the notation "X-PHASE.G2" indicates the gate signal G2 outputted from the control circuit 54 of the rectifier module 5X to the MOS transistor 51. Likewise, the notation "V-PHASE.G1" indicates the gate signal G1 outputted from the control circuit 54 of the rectifier module 6V to the MOS transistor 50, and the notation "V-PHASE.G2" indicates the gate signal G2 outputted from the control circuit 54 of the rectifier module 6V to the MOS transistor 51.

As shown in FIG. 5, in the rectifier module 5X, for example, on-timing of the high-side MOS transistor 50 is set based on the X-phase voltage, and off timing of the high-side MOS transistor 50 is set based on the pulse train signal appearing on the rectifier communication bus so as to be coincident with on-timing of the high-side MOS transistor 50 of the rectifier module 5Y. Likewise, on-timing of the low-side MOS transistor 51 is set based on the pulse train signal appearing on the rectifier communication bus so as to be coincident with on-timing of the high-side MOS transistor 50 of the rectifier module 6V, and off timing of the low-side MOS transistor 51 is set based on the pulse train signal appearing on the rectifier communication bus so as to be coincident with on-timing of the high-side MOS transistor 50 of the rectifier module 6W. On-timings and off-timings of the MOS transistors 50 and 51 of the other rectifier modules are set in the same way as above.

Example (2)

Notification of occurrence of a fault is transmitted among the rectifier modules using the pulse train signal on the communication line.

In the example (1) described above, the pulse train signal changing to the low level at intervals of 60 degrees in electrical angle is delivered to the rectifier communication bus as long as all the rectifier modules operate normally. If a fault occurs in any one of the rectifier modules, the control circuit 54 of the fault rectifier module fixes the voltage of the rectifier communication bus to the low level. Accordingly, the other five rectifier modules operating normally can know occurrence of the fault when they detect that the voltage of the rectifier communication bus is fixed to the low level.

To enable the control circuit 54 to detect the rectifier communication bus is fixed to the low level, the communication circuit 180 may be provided with a circuit to output a signal when the rectifier communication bus is at the low level over a predetermined period longer, for example, than the period corresponding to 60 degrees in electrical angle at the engine idle speed.

If such a fault occurs in any one of the rectifier modules, the other rectifier modules operating normally cannot set on-timing and off-timing of the MOS transistors 50 and 51 based on the pulse train signal on the rectifier communication, because the rectifier communication bus is fixed to the low level after occurrence of the fault. Accordingly, in this case, the control circuit 54 continues the rectifying operation by setting on-timing and off-timing of the MOS transistors 50 and 51 based on the voltage of the phase winding connected to the rectifier module in which this control circuit 54 is included.

Example (3)

Occurrence of a fault in the rectifier modules is detected using the pulse train signal on the communication line, and the power control generation device 7 notifies the ECU 8 of occurrence of the fault. In this example, the power generation control device 7 can detect a fault in the rectifier module in the similar way as in the example (2).

By the provision of a circuit to output a signal when the rectifier communication bus is at the low level over a predetermined period longer, for example, than the period corresponding to 60 degrees in electrical angle at the engine idle speed, the power generation control device 7 can know that the rectifier communication bus is fixed to the low level.

Upon detecting occurrence of a fault in any one of the rectifier modules based on the pulse train signal on the rectifier communication bus, the power generation control device 7 changes the voltage of the L-terminal thereof from the high level to the low level to notify the ECU 8 of occurrence of the fault.

The L-terminal may be a diag terminal used to notify the ECU 8 of whether power is being generated and to light a charge lamp when power is not generated. Accordingly, a low-level signal is outputted from the L-terminal before start of power generation, and a high-level signal is outputted from the L-terminal after start of power generation.

Figure 6:
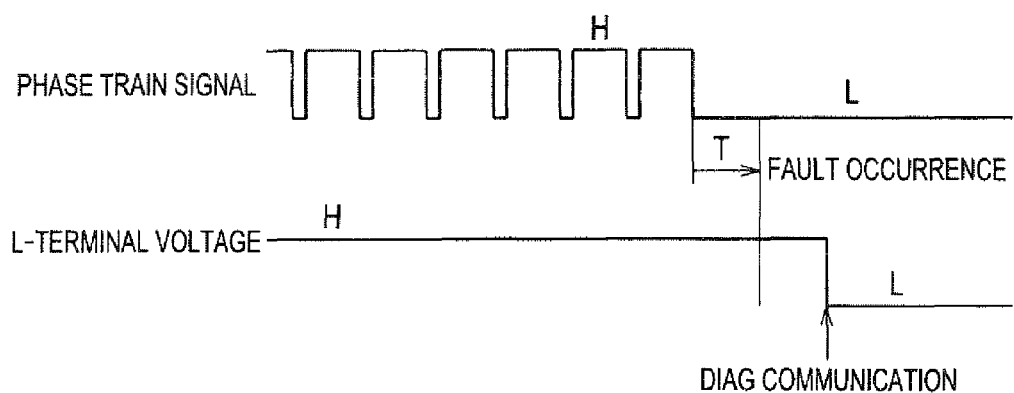
FIG. 6 is a diagram showing a relationship between a timing at which a fault is detected in the rectifier module and a timing at which a notification is transmitted to the ECU.

FIG. 6 is a diagram showing a relationship between a timing at which the power generation control device 7 detects occurrence a fault in one of the rectifier modules and a timing at which the power generation control device 7 notifies the ECU 8 of occurrence of the fault. As shown in FIG. 6, the power generation control device 7 determines occurrence of a fault when the pulse train signal on the rectifier module bus continues to be at the low level over a predetermined time T, and transmits a notification indicative of occurrence of the fault to the ECU 8 by changing the voltage of the L-terminal from the high level to the low level.

Example (4)

In the above examples (1) to (3), the operations of the rectifier modules are controlled using the pulse train signal delivered to the rectifier communication bus connecting the power generation control device 7 to the rectifier modules.

However, in a case where bi-directional serial communication (for example, LIN communication using LIN (Local Interconnect Network) protocol) is performed between the power generation control device 7 and the ECU 8 through a serial communication line laid therebetween, this serial communication line can be used also for communication among the rectifier modules.

Figure 7:
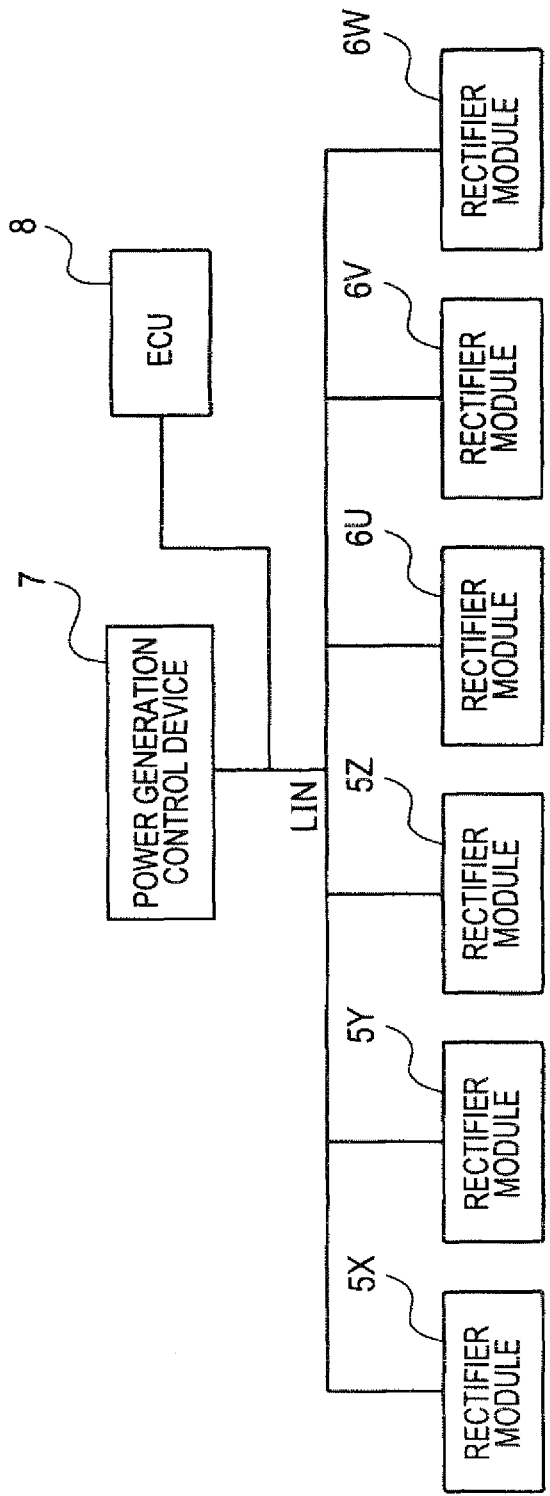
FIG. 7 is a diagram showing connection among the power generation control device, the rectifier modules and the ECU by use of a LIN communication line.

FIG. 7 is a diagram showing connection by a LIN communication line among the power generation control device 7, rectifier modules and the ECU 8.

Figure 8:
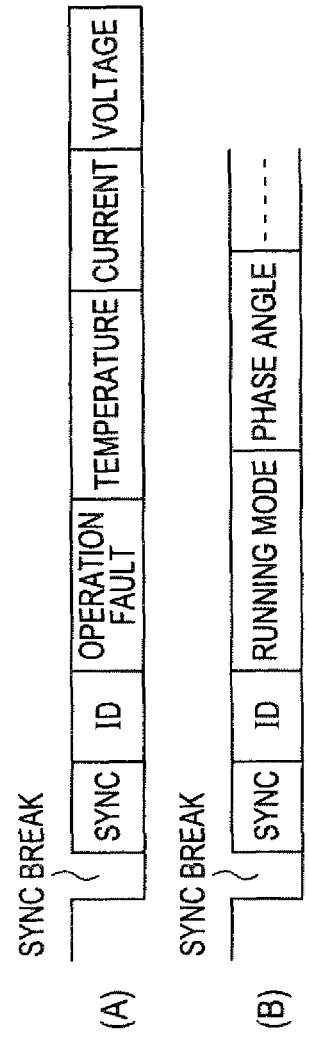
FIG. 8 is a diagram showing an example of a communication message exchanged between the rectifier modules and the ECU.

The section (A) of FIG. 8 shows the structure of a transmit frame of a communication message transmitted from the rectifier modules to the ECU 8. The section (B) of FIG. 8 shows the structure of a receive frame of a communication message transmitted from the ECU 8 to the rectifier modules.

As shown in the section (A) of FIG. 8, the transmit frame includes a sync break, a sync field, an ID field, an operation fault, a temperature, a current and a voltage. The operation fault is data indicating presence or absence of a fault in the MOS transistors 50 and 51, and type of a fault that has occurred. The temperature, current and battery included in the transmit frame are data respectively detected by the temperature detection section 150, the current detection section 180, and the battery voltage detection section 110 and battery voltage detection section 110.

As shown in the section (B) of FIG. 8, the receive frame includes a sync break, a sync field, an ID field, a running mode and a phase angle. By receiving the phase angle and the running mode used to control the MOS transistors 50 and 51 from the ECU 8, it is possible to perform different modes of power generation including a synchronous rectifying mode attaching importance to power generation efficiency, a phase control mode attaching importance to the output current to generate maximum power by passing a current leading the phase voltage to each of the stator windings 2 and 3, and a regenerative power generation mode to lower the engine speed by lowering the efficiency of the vehicle generator 1 to thereby increase the torque load of the engine to apply break.

Figure 9:
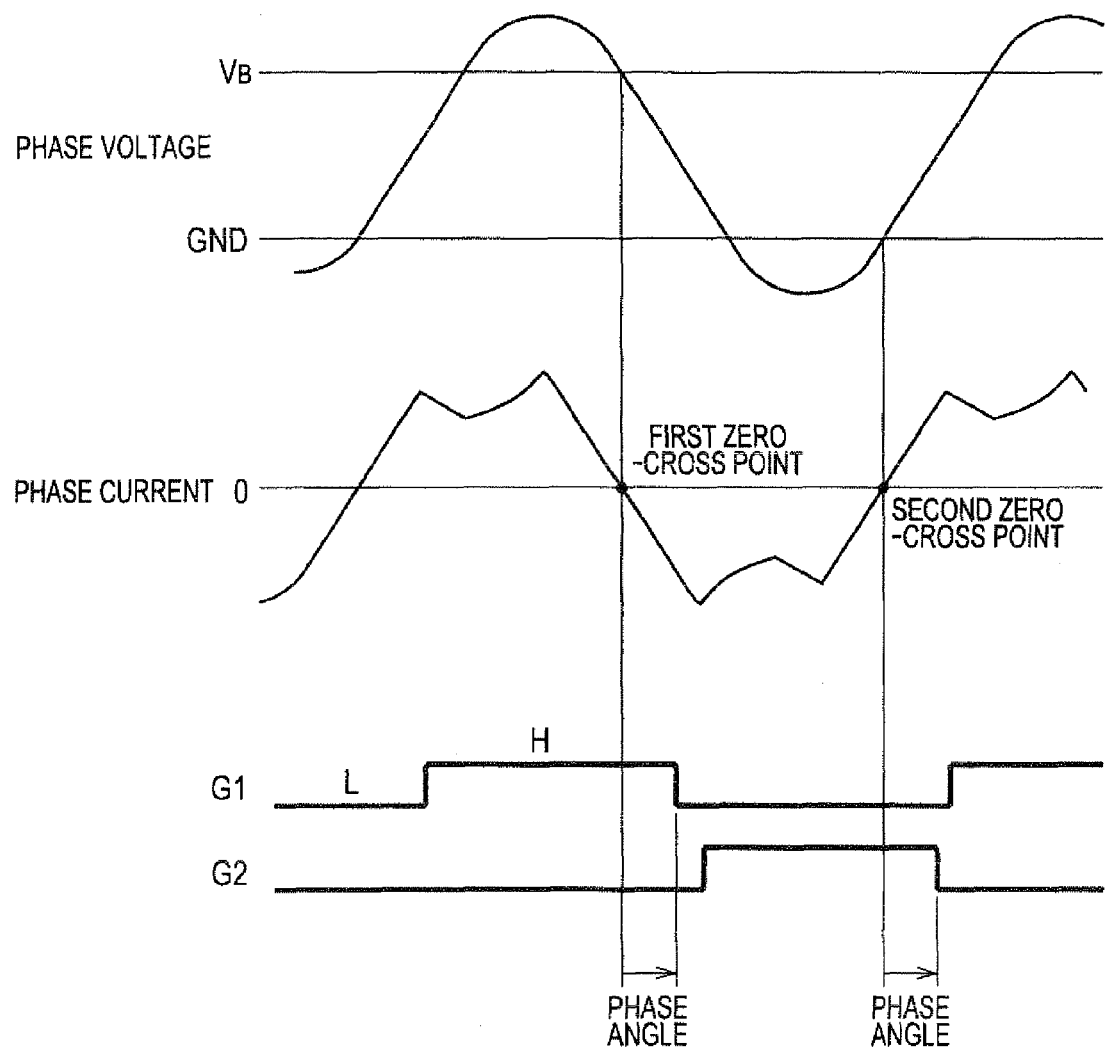
FIG. 9 is a diagram showing an example of the operation of the vehicle generator when the rectifier modules are operated in a phase control mode.

FIG. 9 is a diagram showing an example of the operation of the vehicle generator when the rectifier modules operate in the phase control mode specifying a specific phase angle. In FIG. 9, the notation "G1" indicates the gate signal applied to the high-side MOS transistor 50 by the control circuit 54, and the notation "G2" represents the gate signal applied to the low-side MOS transistor 51 by the control circuit 54. When the phase control mode and a specific phase angle are specified, each of the rectifier modules detects a first zero-cross point at which the polarity of the phase current flowing through the corresponding phase winding changes from positive to negative, sets the time elapsed from the first zero-cross point by the specified phase angle as off-timing of the high-side MOS transistor 50, detects a second zero-cross point at which the polarity of the phase current flowing through the corresponding phase winding changes from negative to positive, and sets the time elapsed from the second zero-cross point by the specified phase angle as off-timing of the low-side MOS transistor 51.

The first and second zero-cross points can be detected respectively based on the source-drain voltages of the MOS transistors 50 and 51. On-timing of each of the MOS transistors 50 and 51 may be set with reference to a time at which the phase voltage exceeds a predetermined threshold, or the first or second zero-cross point.

Figure 10:
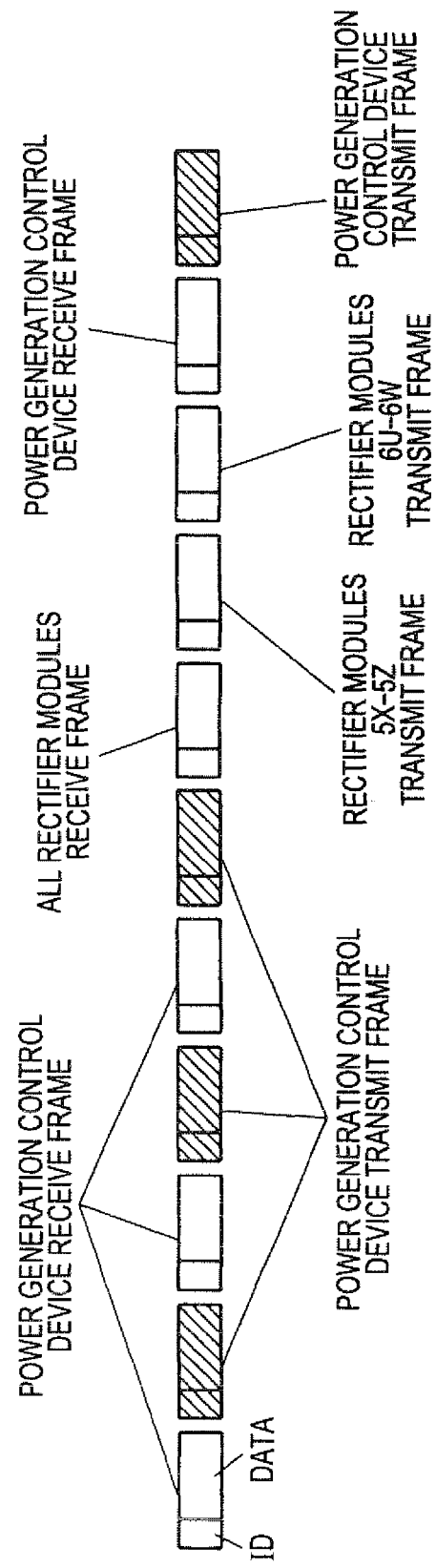
FIG. 10 is a diagram showing an example of a communication schedule when LIN communication is performed among the power generation control device, ECU and rectifier modules.

FIG. 10 is a diagram showing an example of a communication schedule when LIN communication is performed among the power generation control device 7, ECU 8 and rectifier modules. In FIG. 10, the notation "POWER GENERATION CONTROL DEVICE RECEIVE FRAME" indicates a frame transmitted from the ECU 8 and received by the power generation control device 7, and the notation "POWER GENERATION CONTROL DEVICE TRANSMIT FRAME" indicates a frame transmitted from the power generation control device 7 and received by the ECU 8. The frame exchange frequency between the power generation control device 7 and the ECU 8 is set depending on the time constant of the rotor, for example, set to 20 times per second when the time constant of the rotor is 200 ms.

Further, the notation "ALL RECTIFIER MODULES RECEIVE FRAME" indicates a frame transmitted from the ECU 8 to all the rectifier modules 5X, 5Y, 5Z, 6U, 6V and 6W, the notation "RECTIFIER MODULES 5X-5Z TRANSMIT FRAME" indicates a frame transmitted from any one of the rectifier modules 5X, 5Y and 5Z, and the notation "RECTIFIER MODULES 6U-6W TRANSMIT FRAME" indicates a frame transmitted from any one of the rectifier modules 6U, 6V and 6W. The frame exchange frequency between the power generation control device 7 and the rectifier modules is set lower than the frame exchange frequency between the power generation control device 7 and the ECU 8, for example, set to around 1 per second. Alternatively, frame exchange between the rectifier modules and the ECU 8 may be performed each time frame exchange between the power generation control device 7 and the ECU 8 is performed a predetermined number of times (32 times, for example).

Example (5)

In the example (4), since a frame transmitted from each of the rectifier modules to the ECU 8 includes data regarding an operation fault as shown in the section (A) of FIG. 8, the ECU 8 can know occurrence of a fault by receiving this frame.

However, as an alternative and simple way to enable the ECU 8 to detect occurrence of a fault, LIN communication between the power generation control device 7 and the ECU 8 may be interrupted when a fault occurs in any one of the rectifier modules.

Figure 11:
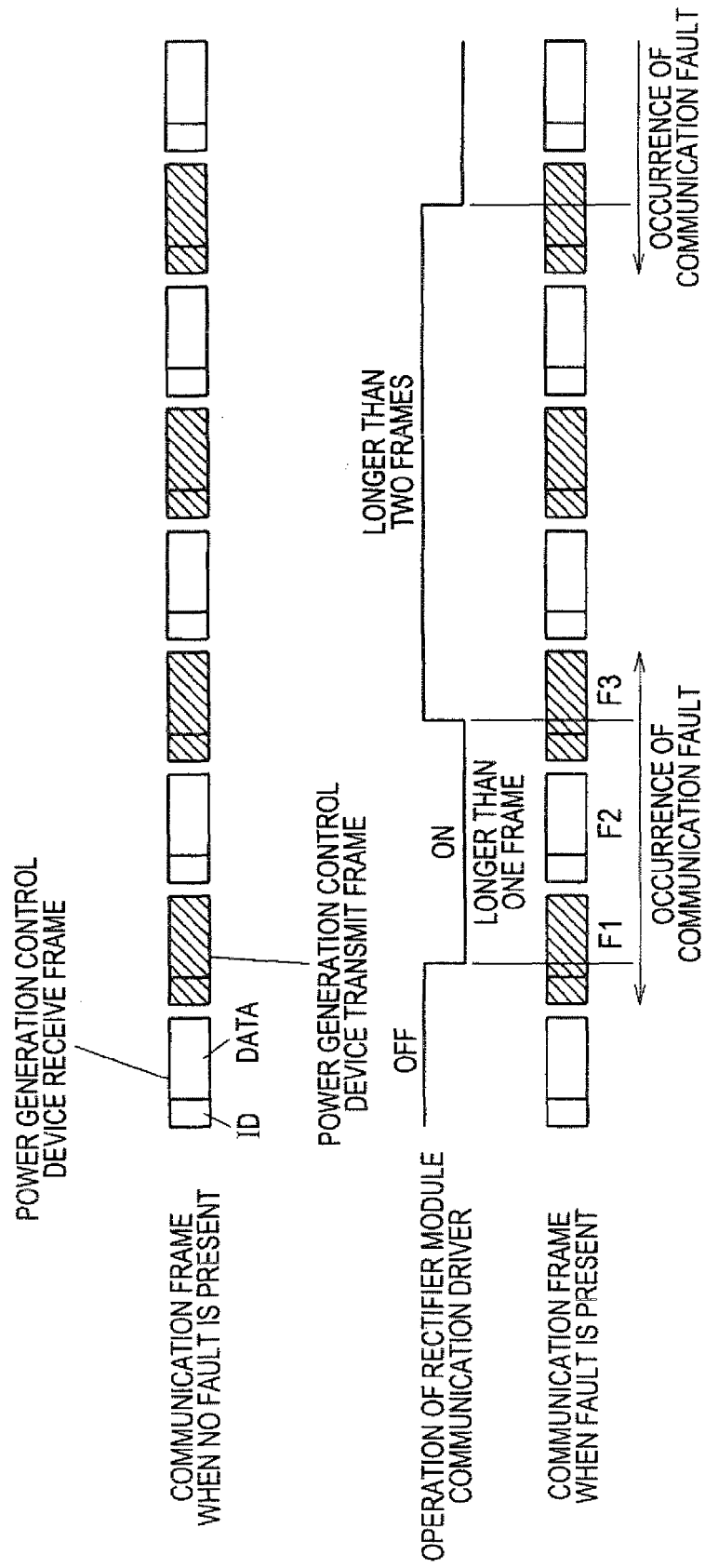
FIG. 11 is a diagram showing an example of communication frames to make notification of occurrence of communication fault due to communication interruption.

FIG. 11 is a diagram showing an example to enable the ECU 8 to know occurrence of a fault by interrupting LIN communication between the power generation control device 7 and the ECU 8. As shows in FIG. 11, frame transmission and frame reception are repeated alternately between the power generation control device 7 and the ECU 8 while there is no fault. When a fault occurs in any one of the rectifier modules, the control circuit 54 of the fault rectifier module interrupts frame transmission and reception by LIN communication by periodically turning on (pulling up) a communication driver constituted of, for example, a pull-up resistor and a switching element included in the communication circuit 180, for a period longer than one communication frame. In the example shown in FIG. 11, transmission and reception of three frames F1, F2 and F3 are interrupted. The reason why the communication driver is turned on for a period longer than one communication frame is to interrupt transmission and reception of at least two frames with certainty to reliably notify the ECU 8 of occurrence of a fault. If the communication driver is turned on for a period shorter than one communication frame, there may occur a case where only frame reception at the power generation control device 7 is interrupted, and the ECU 8 cannot be notified of occurrence of a fault. The interval of timing to turn on the communication driver, which comes periodically, is set to a period sufficiently long to prevent the communication from being interrupted (for example, a period longer than two frames). This is to enable data regarding power generation control to be exchanged between the power generation control device 7 and the ECU 8 in conjunction with transmission of notification of occurrence of a fault.

Example (6)

The examples (1) to (5) are directed to the case where the vehicle generator 1 performs power generating operation.

However, if the vehicle generator 1 is provided with a position sensor to detect the rotational position (electrical angle) of the rotor relative to the stator, and detection result of the rotational position is transmitted from the vehicle generator 1 to the rectifier modules, the vehicle generator 1 can be used as a vehicle motor-generator capable of performing both power generating operation and electrically-driven operation.

Figure 12:
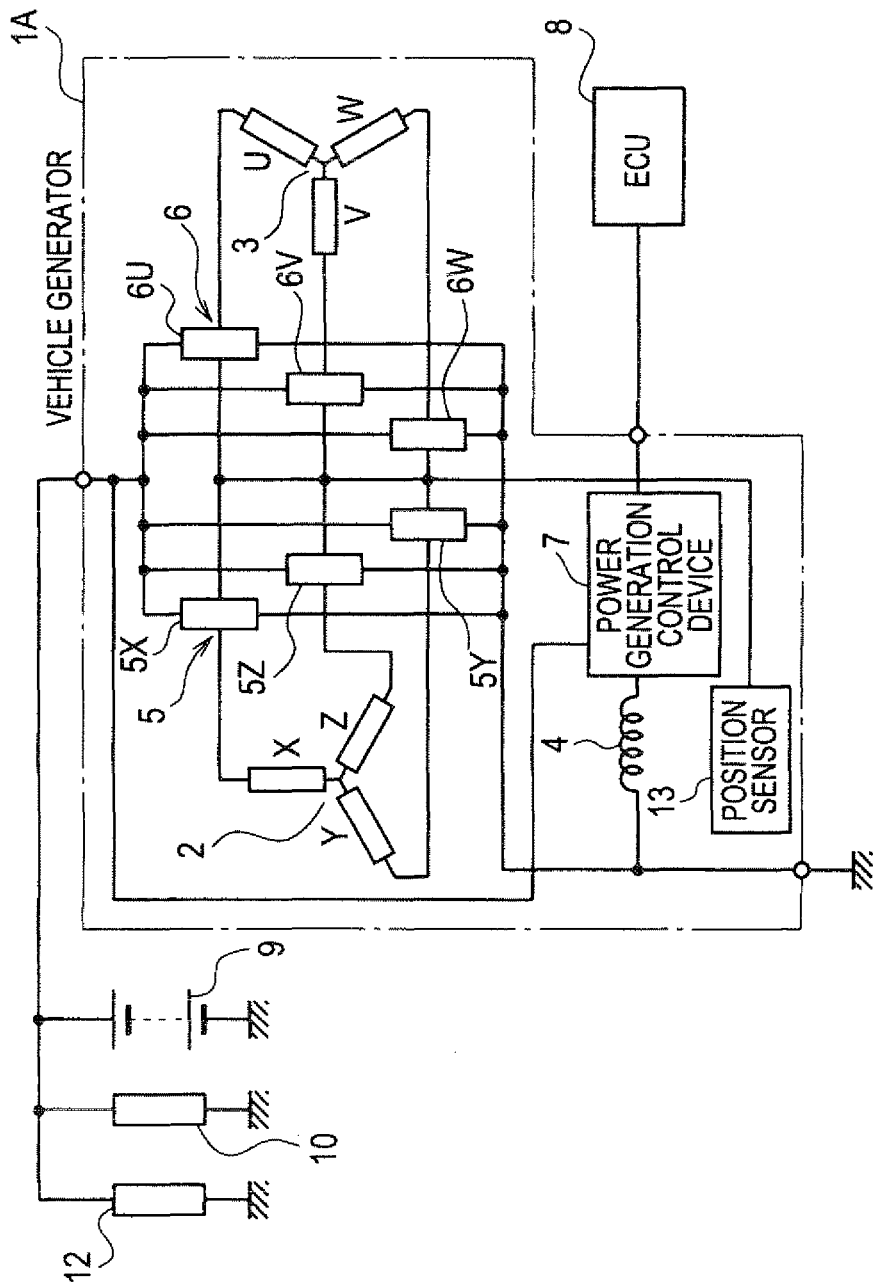
FIG. 12 is a diagram showing the structure of a modification of the vehicle generator of according to the embodiment of the invention.

FIG. 12 is a diagram showing the structure of a vehicle generator 1A as a modification of the vehicle generator 1 described above. As shown in FIG. 12, the vehicle generator 1A is additionally provided with a position sensor 13 to detect a rotational position of the rotor compared to the vehicle generator 1 shown in FIG. 1. There are various methods to detect the rotational position (electrical angle) of the rotor using the position sensor 13. For example, the position sensor 13 may include a detection coil fixed to the frame of the vehicle generator 1 to detect the rotational position of a magnetic body fixed to the rotor. For another example, the position sensor 13 may include a hall element fixed to the frame of the vehicle generator 1 to detect the rotational position of a permanent magnet fixed to the rotor. Other than the above, a variable-reluctance type resolver, or a optical sensor may be used to detect the rotational position of the rotor.

Figure 13:
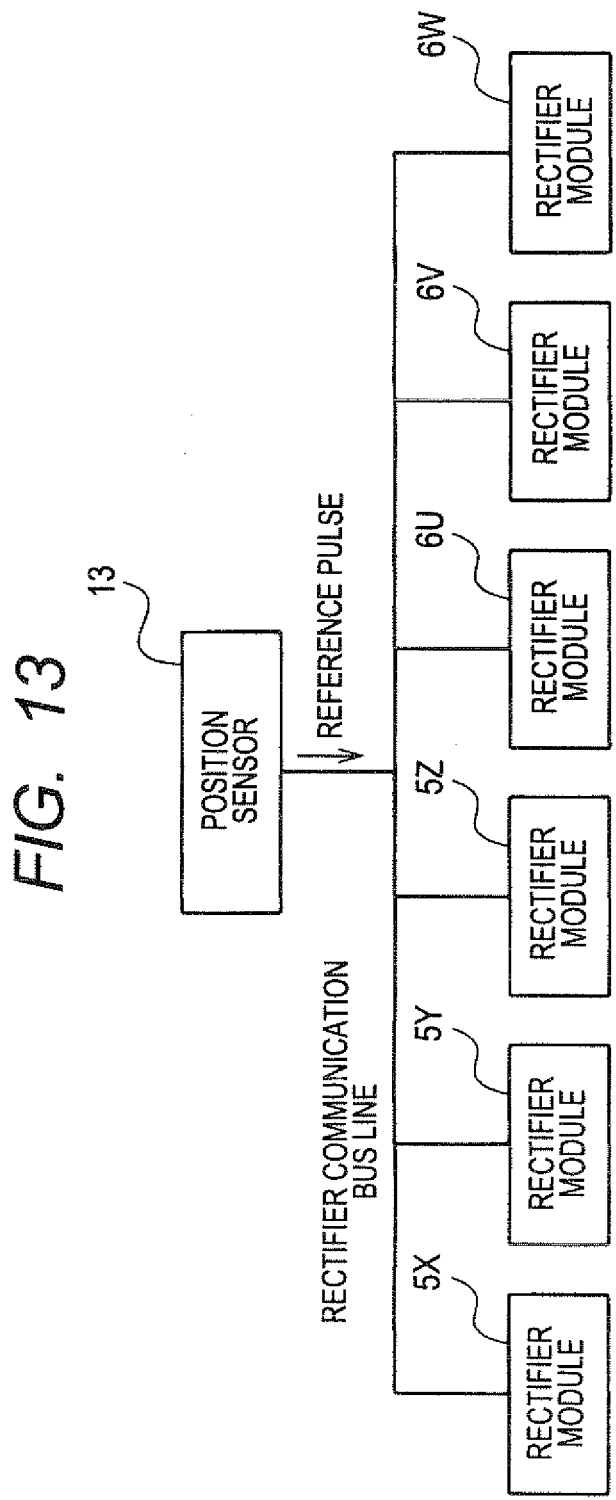
FIG. 13 is a diagram showing a connection between a position sensor to detect the rotational position of the rotor of the vehicle generator and the rectifier modules.

FIG. 13 is a diagram showing an example of connection between the position sensor 13 and the rectifier modules. In this example, the position sensor 13 and the rectifier modules are connected through the rectifier communication bus, and a reference pulse is transmitted from the position sensor 3 to the rectifier modules. This reference pulse is outputted when the rotor makes a predetermined electrical angle with the stator. In this example, this reference pulse is outputted once per 360 degrees in electrical angle. However, this reference pulse may be outputted two or more times per 360 degrees in electrical angle.

FIG. 14 is a diagram showing a relationship between output timings of the reference pulse and control timings of the rectifier modules. Each of the rectifier modules performs timing calculation based on the reference pulse outputted from the position sensor 13 to set a timing reference for its own use to control on/off timings of the MOS transistors 50 and 51. In FIG. 14, the timing references for the rectifier modules 5X, 5Y, 5Z, 6U, 6V and 6W are indicated as 5X-reference, 5Y-reference, 5Z-reference, 6U-reference, 6V-reference and 6W-reference, respectively. According to this modification, it is possible that the vehicle generator 1A performs power generating operation to charge the battery 9 or supply electric power to the electrical loads 10 and 12, and performs electrically-drive operation using power supplied from the battery 9.

It is a matter of course that various modifications can be made to the above embodiment as described below. The vehicle generator of the above embodiment includes two stator windings 2 and 3, and two rectifier module groups 5 and 6. However, the present invention is also applicable to a vehicle generator including one rotor and one rectifier module group. Further, although the vehicle generator of the above embodiment includes two stator windings 2 and 3 each of which is star-connected, the present invention is also applicable to a vehicle generator including one or more delta-connected stator windings.

The above explained preferred embodiments are exemplary of the invention of the present application which is described solely by the claims appended below. It should be understood that modifications of the preferred embodiments may be made as would occur to one of skill in the art.

What is claimed is:

1. A vehicle generator comprising:
a rotor wound with a field winding for energizing magnetic poles of the rotor;
a stator wound with a stator winding as a multi-phase winding for generating an AC voltage depending on a rotating magnetic file generated by the field winding;
rectifier modules respectively connected to corresponding output terminals of the stator winding; and
a power generation control device to control a power generation voltage of the vehicle generator formed from outputs of the rectifier modules by controlling an excitation current flowing through the field winding;
wherein each of the rectifier modules includes a pair of a first MOS transistor and a second MOS transistor series-connected between positive and negative terminals of a battery,
the rectifier modules are connected with one another through a communication line, and
the rectifier modules exchange data regarding control of the first and second MOS transistors of the rectifier modules by a pulse train signal transmitted on the communication line.

2. The vehicle generator according to claim 1, wherein each of the rectifier modules includes a monitor section to monitor operation of the first and second MOS transistors, a communication section to transmit and receive the pulse train signal through the communication line, and is configured to make a change in level to the pulse train signal outputted from the communication section when the monitor section detects a fault in at least one of the first and second MOS transistors.

3. The vehicle generator according to claim 2, wherein the power generation control device is connected with the communication line, has a communication function to perform communication with an external control device through the communication line, and is configured to notify the external control device of occurrence of a fault in at least one of the rectifier modules upon detecting that the pulse train signal has been made with the change.

4. The vehicle generator according to claim 2, wherein the power generation control device has a function to perform serial communication with the external control device through a serial communication line, the serial communication line being used also as the communication line for connection among the rectifier modules, the external control device being configured to detect a fault by monitoring the pulse train signal delivered to the serial communication line.

5. The vehicle generator according to claim 4, wherein each of the rectifier modules is configured to periodically interrupt serial communication between the power generation control device and the external control device upon detecting the fault in order to notify external control device of occurrence of the fault.

6. The vehicle generator according to claim 1, wherein the pulse train signal is a pulse signal having level change timings corresponding to on/off control timings of the first and second MOS transistors.

7. The vehicle generator according to claim 6, wherein each of the rectifier modules detects a zero-cross point at which polarity of a current flowing to one of the first and second MOS transistors changes, and sets, as off-timing of the one of the first and second MOS transistors, a time elapsed from the zero-cross point by a predetermined phase angle received from the external control device through the communication line.

8. The vehicle generator according to claim 6, further comprising a position sensor to detect a rotational position of the rotor with respect to the stator and to deliver a reference pulse indicative of the detected rotational position to the communication line, each of the rectifier modules being configured to set on/off timings of the first and second MOS transistors based on the reference pulse to enable the vehicle generator to selectively perform one of power generating operation and electrically-driven operation.

* * * * *